March 30, 1965 P. P. NOVAS 3,175,394
POWER OUTPUT INDICATING SYSTEM
Filed Sept. 11, 1961 3 Sheets-Sheet 1

INVENTOR.
Peter P. Novas
BY Paul O. Pippel
Atty.

March 30, 1965   P. P. NOVAS   3,175,394
POWER OUTPUT INDICATING SYSTEM
Filed Sept. 11, 1961   3 Sheets-Sheet 2

INVENTOR.
Peter P. Novas
BY Paul O. Pippel
Atty.

March 30, 1965  P. P. NOVAS  3,175,394

POWER OUTPUT INDICATING SYSTEM

Filed Sept. 11, 1961  3 Sheets-Sheet 3

INVENTOR.
Peter P. Novas
BY Paul O. Pippel
Atty.

United States Patent Office 3,175,394
Patented Mar. 30, 1965

3,175,394
POWER OUTPUT INDICATING SYSTEM
Peter P. Novas, Forest Park, Ill., assignor to International Harvester Company, Chicago, Ill., a corporation of New Jersey
Filed Sept. 11, 1961, Ser. No. 137,320
7 Claims. (Cl. 73—136)

This invention is directed to an instrument system for accurately indicating the output of a power plant, whether measured in torque, horsepower and/or drawbar-pull, and more particularly to such a system which is economical, simple, and lightweight to afford ready mounting on or adjacent the power plant itself.

The novel instrument system of the invention finds utility with many types of engines, including gasoline, L.P. gas, diesel, turbine, and free piston engines. Previous attempts to measure the output of such an engine have generally been conducted in a laboratory setting with large, expensive and complicated devices such as a dynamometer, which is manifestly not suitable for mounting on a vehicle with the power plant. Accordingly, conventional motors or power plants, whether utilized in a vehicle to drive the same or otherwise, are generally provided with simple gauges to measure such variables as speed, temperature, or pressure. The tachometer, thermocouple and pressure sensitive devices utilized to provide this basic information are inexpensive and readily installed on the plant. However, each of such gauges measures only a single parameter. Because the actual output in torque and/or horsepower of the power plant is a complex function of more than one interrelated parameter, it has not been practical to provide any reasonable indication thereof on the instrument panel of a vehicle driven by the power plant.

It is accordingly a primary object of the present invention to provide a simple, inexpensive and easily installed instrument system for measuring complex functions such as torque, horsepower, and drawbar-pull produced by a vehicle.

An important object of the invention is the provision of such a system which is sufficiently lightweight to make practical its installation directly on the vehicle or power plant iself, in contradistinction to the relatively heavy prior art arrangements such as a dynamometer which are as a practical matter restricted to laboratory applications.

The foregoing and other objects are attained, in a preferred embodiment of the invention, by providing an electrical circuit which simulates the transfer function of the power plant. A motor input signal is derived from the input of the power plant, for example, from the throttle shaft of the carburetor in a gasoline engine, and this motor input signal is applied to the input side of the electrical circuit, to produce an output signal related to the output (e.g., torque) of the motor. The horsepower of the motor can be provided by deriving a signal related to motor speed from the output side of the power plant and applying this speed signal to the electrical circuit, thereby effectively combining the speed and torque indications to provide a composite output indication related to the actual horsepower developed by the power plant.

In one refinement of the system, the electrical circuit includes a first network for providing a basic torque indication, and a second network which effectively provides a correction factor related to the torque rise of the power plant. In another refinement concerned with power plants which have the effective output power varied through a gear selector and/or a torque amplifier, the torque output signal is modified in accordance with the actual position of the gear selector and of the torque amplifier to provide an output indication related to the drawbar-pull developed by the power plant.

To enable those skilled in the art to make and use the invention, various embodiments thereof will be described and the mode of operation explained in connection with the accompanying drawings, in the several figures of which like reference numerals identify like elements, and in which.

*General description of the invention*

Figure 1:
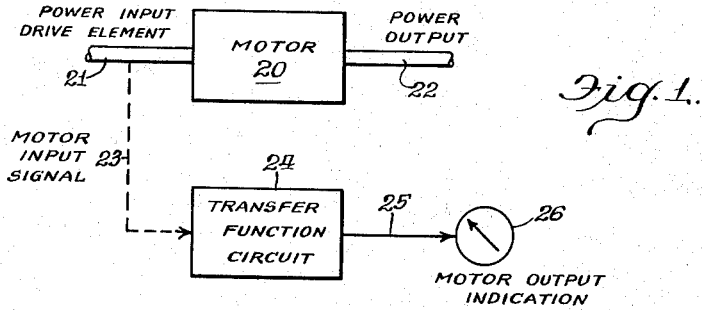
FIGS. 1 and 2 are block diagrams depicting the inventive system in relation to an associated power plant.

In the simplified showing of FIG. 1, a motor or power plant 20 is depicted with a power input drive element 21 and a power output shaft 22. As will be made clear hereinafter, the power input drive element 21 may be the throttle shaft which positions the throttle plate in the carburetor of a gasoline engine, and the power output shaft 22 can be the crankshaft. In accordance with the invention, a linkage 23 is intercoupled between power input drive element 21 and transfer function circuit 24, which in turn is coupled over output means 25 to a meter or indicating means 26. Transfer function circuit 24 is an electrical circuit which simulates at least one mechanical characteristic of motor 20, so that upon application over linkage 23 of an input signal representative of the drive to the motor, an output signal is provided on output means 25 related to the power output level of the motor. By displaying this signal on an indicating means, such as meter 26, the operator of a vehicle driven by motor 20 can receive information, such as the torque produced by the motor for transmission to the vehicle.

Figure 2:
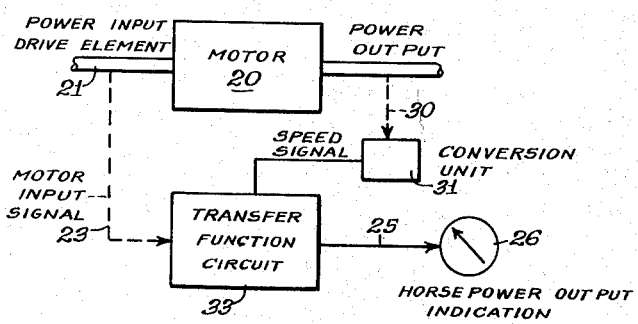

The showing of FIG. 2 is that of a system for producing on meter 26 an indication of the horsepower output of the motor 20. That is, an output signal related to speed is provided on linkage 30, which intercouples power output shaft 22 with an energy conversion unit 31, which may be a unit such as a tachometer for converting a mechanical signal into an electrical signal. The conversion unit is coupled over a conductor or circuit 32 to provide a speed input signal to transfer function circuit 33, which also receives a motor input signal over linkage 23. Accordingly, a composite output signal is provided from transfer function circuit 33 over output means 25 and registered on meter 26 to depict the actual horsepower output of motor or power plant 20.

*Detailed description of the invention*

Figure 3:
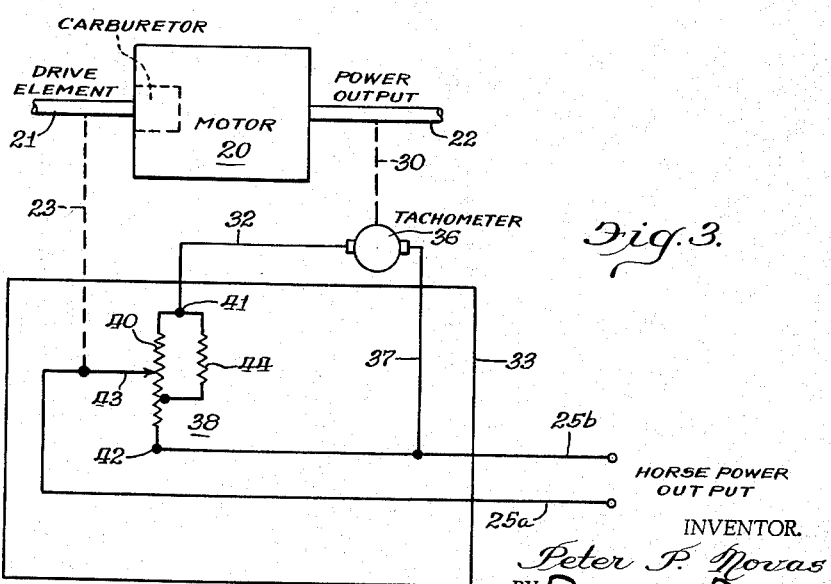
FIG. 3 is a simplified schematic diagram of certain components shown in block form in FIG. 2.

The system components shown generally in simplified form in FIG. 2 are indicated in greater detail in FIG. 3. More specifically, the conversion unit is there represented as a tachometer 36, a well-known means for translating mechanical energy into electrical signals. Other conversion units, such as an electric motor driven by a linkage coupled to the power output shaft of the motor, can likewise be used in this portion of the instrument system. The electrical output signal related to motor speed is applied from tachometer 36 over conductors 32 and 37 across a nonlinear potentiometer 38, which for illustrative purposes is depicted as a conventional potentiometer 40 having a pair of end terminals 41 and 42, and a movable connection or arm 43, with a resistor 44 coupled between one end of potentiometer 40 and a fixed connection thereon. In accordance with this invention, movable arm 43 is coupled to linkage 23, and thus positioned as a function of movement of the drive element 21 of the power plant, at the same time that the electrical speed signal is being applied across end terminals 41 and 42 of the potentiometer.

The output signal from circuit 33 is taken from movable arm 43 of the potentiometer over conductor 25a to an associated meter (not shown in this view), and from end terminal 42 over conductor 25b to the same meter. Circuit 33 simulates a mechanical characteristic of the motor, which for convenience will be termed the "basic torque" characteristic. Accordingly an input signal related to motor torque is applied thereto over linkage 23 concomitantly with the application of a speed signal over conductors 32 and 37, and the output signal appearing on conductors 25a and 25b is related to the actual horsepower output of the power plant. It is emphasized that only the speed signal is derived from the output side of the power plant, and the signal representing the drive to the motor is derived from the input side, by a coupling to the throttle shaft or other suitable input controlling element.

Figure 4:
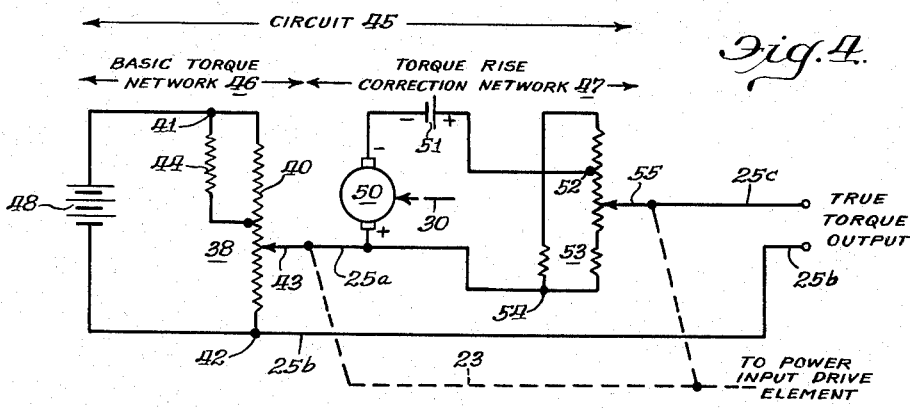
FIG. 4 is a schematic diagram illustrating an electrical circuit useful in another embodiment of the invention.

A refinement of the circuitry of FIG. 3 is depicted in FIG. 4, wherein electrical circuit 45 comprises a first network 46 for simulating the basic torque characteristic of the motor, and a second network 47 represents the "torque rise correction factor" of the system. In more detail, basic torque network 46 is related to circuit 33 in FIG. 3, except that instead of providing a speed signal by tachometer 36, a battery 48 or other means for applying a potential difference of reference level to potentiometer 38 is provided. Such means can be the same battery (or a portion thereof) utilized in the vehicle to power the starter motor and other components, and need not be a separate power supply for the instrument system. From the foregoing explanation of FIG. 3, the provision of an electrical signal at conductors 25a and 25b in FIG. 4, which signal represents the basic torque produced by motor 20 as the power input thereto is varied, will be apparent.

Torque rise correction network 47 includes a conversion unit or tachometer 50, one output terminal of which is coupled to conductor 25a and the other output terminal of which is coupled over a battery or cell 51 to one end terminal 52 of nonlinear potentiometer 53, which also comprises another end terminal 54 coupled to conductor 25a, and a movable connection or arm 55 coupled to output conductor 25c. Battery 51 need not be a separate cell, but can be a reference potential difference obtained by utilizing a portion of the energy provided by the storage battery in the vehicle powered by motor 20. Likewise, although potentiometer 53 is a unitary component, it is illustrated as a potentiometer with two separate resistors connected thereto to simulate a nonlinear characteristic for purposes to be explained more fully hereinafter.

Figure 5:
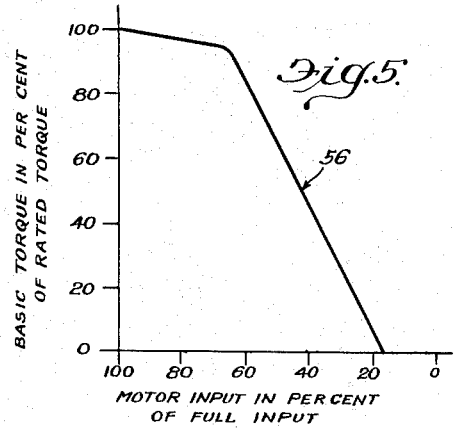
FIGS. 5 and 6 are schematic diagrams useful in explaining the operation of the embodiment including the circuitry of FIG. 4.

In operation, as the motor input drive is varied the position of movable arm 43 in basic torque network 46 is varied to provide an electrical output signal in accordance with the function illustrated by curve 56 in FIG. 5. This nonlinear characteristic is achieved by the provision of a nonlinear potentiometer, which for illustrative purposes is depicted as a conventional potentiometer with a fixed resistor parallel-connected across a portion thereof. With the application of a constant voltage from battery 48 across the end terminals of the potentiometer, movement of arm 43 in accordance with motor input provides a power input signal between conductors 25a and 25b.

The linkage 23 for effecting displacement of movable arm 43 as a function of the motor input drive signal can be a simple connection of a potentiometer shaft to the throttle shaft or a similar element, as will be explained hereinafter. The basic torque network 46 is calibrated to provide the desired characteristic curve 56 at some reference speed of the power plant.

At this same reference speed, tachometer 50 in the torque rise correction network 47 is adjusted to provide an output potential of an amplitude equal to, and a polarity opposite to, the amplitude and polarity of the potential supplied by battery 51, thereby providing a zero net corrective voltage signal between conductor 25a and output conductor 25c. As the output speed of the motor varies above and below the reference or calibration speed, the net correction potential is accordingly varied and applied across nonlinear potentiometer 53. Network 47 simulates a torque rise correction factor characteristic such as that illustrated by curve 57 in FIG. 6. With these two signals (basic torque and torque rise correction factor) effectively combined in circuit 45, the net output indication appearing on conductors 25b and 25c is an accurate portrayal of the torque developed by the motor or power plant. Accordingly, an electrical meter coupled to conductors 25b and 25c provides an indication of the true torque output of the power plant at any given instant.

Figure 6:
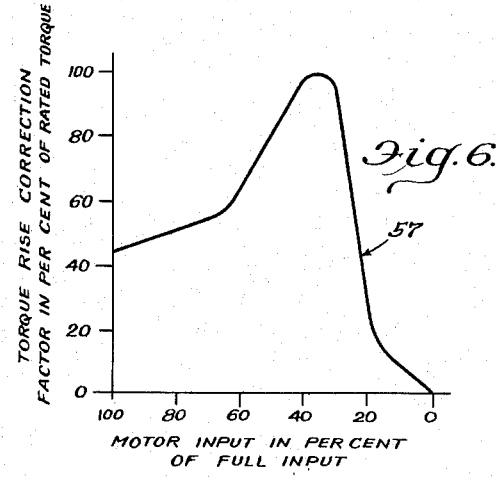

It is noted that the characteristics depicted in FIGS. 5 and 6, although set forth in a preferred embodiment which utilizes a gasoline engine as the power plant under instrumentation, remain practically the same for most of the power plants mentioned above (e.g., L.P. gas, diesel, etc.), and therefore after potentiometers 38 and 53 (FIG. 4) are calibrated, such units can be mass-produced and installed in the same manner that a tachometer or other instrument is provided on a vehicle.

Figure 7:
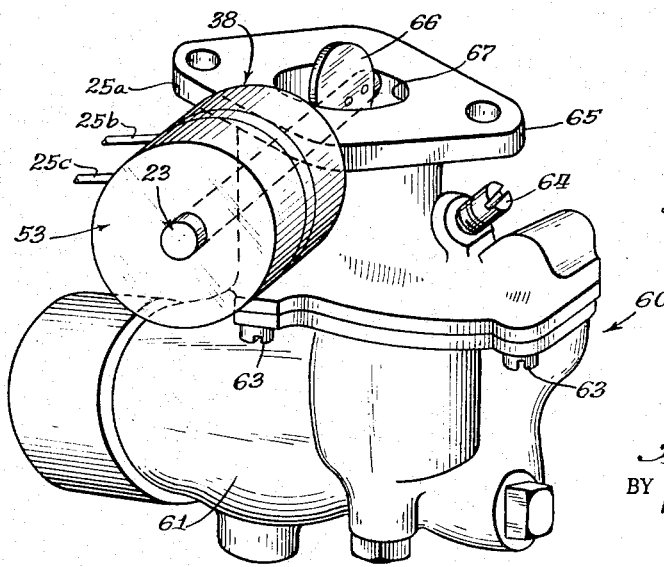
FIG. 7 is a perspective illustration particularly illustrating a portion of a preferred embodiment of the inventive instrument system.

FIG. 7 illustrates the manner in which the motor input signal can be derived from an input drive element of a carburetor utilized with a gasoline engine. As there shown, carburetor 60 includes an intake and carburetor bowl assembly 61 and a throttle body assembly 62 secured together by a plurality of attaching screws 63. The throttle body assembly comprises an idle adjusting screw 64, a flange means 65, and a throttle plate 66 secured on throttle shaft 23, which is journaled within the throttle assembly to afford rotation of the throttle plate in bore 67 of this assembly.

In accordance with the present invention, potentiometers 38 and 53 are mounted on an extension of throttle shaft 23 to have their respective movable connections or arms displaced in accordance with the angular displacement of the throttle shaft. Thus this extension of the throttle shaft serves as a linkage for transferring the motor input signal from the input side of the power plant to the electrical circuit which represents or simulates a transfer function of the mechanical arrangement. This takeoff arrangement for providing the motor input drive signal is light weight, simple to install, and inexpensive, while affording an accurate indication of the actual power input to the motor.

Figure 8:
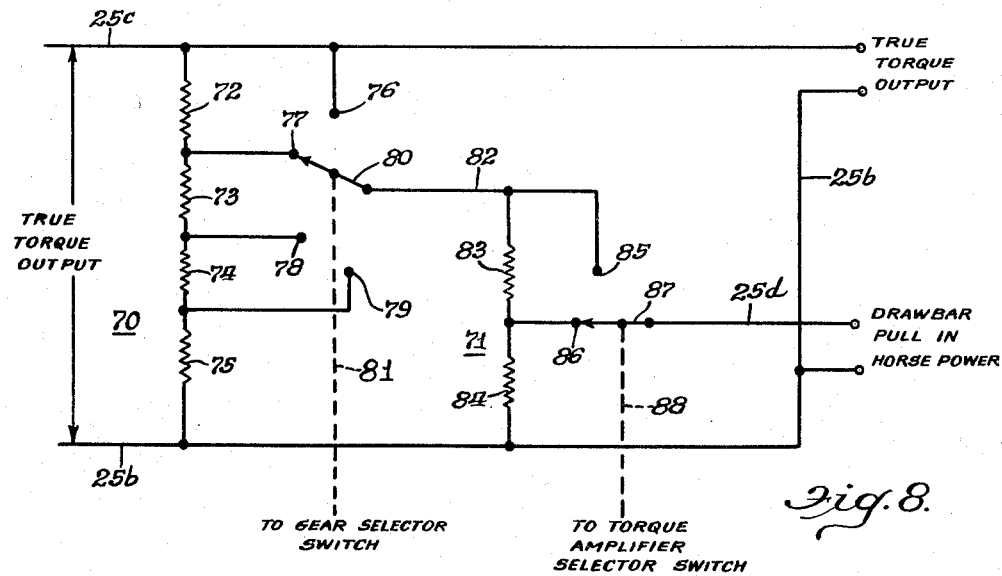
FIGS. 8 and 9 are partial schematic diagrams useful in explaining the operation of the invention.

The circuitry of FIG. 4 utilizes a battery or power source 48 to provide a reference voltage analogous to a constant reference speed for which the basic torque potentiometer 38 is calibrated, and the output signal from the system of FIG. 4 represents the true torque of the power plant. This signal can be modified as indicated in FIG. 8 to provide an indication of the actual drawbar-pull in pounds of a tractor or similar vehicle in which the power plant is mounted. The torque output is essentially applied across a first signal divider arrangement 70 to produce an intermediate electrical signal for application across a second signal divider 71, with the actual drawbar-pull indication being provided on output conductors 25d and 25b. The circuitry of FIG. 8 is particularly useful for tractors, such as those commercially available from the International Harvester Company of Chicago, Illinois, which utilize not only a gear selector arrangement but also a torque amplifier unit, which is a precision-made planetary gear unit located between the engine clutch and the transmission and provides, in effect, two speeds in every gear.

As shown in FIG. 8, signal or voltage divider 70 comprises resistors 72, 73, 74 and 75 series-connected between input conductors 25c and 25b, and the connections between the resistors are brought out to electrical terminals 76–79 respectively. For illustrative purposes a plurality of individual resistance members are indicated, but it will be evident to those skilled in the art that a single or continuous resistor can be utilized, with taps or connections made thereto at various points along the length thereof to provide the desired ratio of signals at terminals or selective connections 76–79. A switch or movable arm 80 is connected over a linkage 81 to the gear selector switch, and is displaceable in unison therewith to the appropriate one of the terminals 76–79 to provide on output conductor 82 an electrical signal of a level related to the torque output of the power plant as modified by the particular gear in which the transmission is then engaged.

The signal betwen conductors 82 and 25b is applied across voltage or signal divider 71, including series-connected resistors 83 and 84, which also can obviously be a single resistor with a tap or connection made at the appropriate point thereon. Conductor 82 is connected to a terminal or selective connection 85, and the common connection of resistors 83 and 84 is brought out to a terminal 86. Movable contact 87, provided for selective engagement with one of terminals 85 and 86, is coupled over a linkage 88 to the torque amplifier selector switch, to effect a movement of contact or switch 87 in unison with the positioning of the torque amplifier selector switch, thereby to modify the electrical signal appearing between conductors 82 and 25b in accordance with the instantaneous position of the torque amplifier unit. Thus the output electrical signal appearing between conductors 25d and 25b, representing the drawbar-pull in pounds, is essentially the true torque output signal applied to the circuitry of FIG. 8 as modified by the series-connected gear selector signal divider circuit and torque amplifier signal divider circuit.

Figure 9:
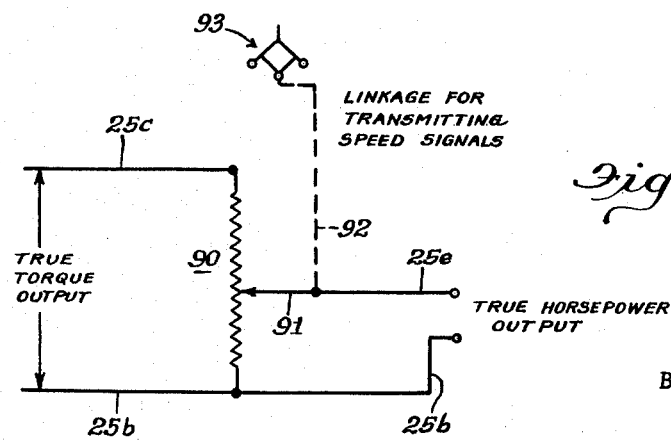

FIG. 9 illustrates still another embodiment of the invention, in which the true torque output signal appearing on conductors 25c and 25b of FIG. 4 can be modified over a circuit including a signal or voltage divider 90 to provide a signal level related to the true horsepower output of the power plant. That is, movable arm 91 of the potentiometer or voltage divider 90 can be coupled over a linkage 92 to a centrifugally operated arrangement 93, or to analogous means for providing a displacement signal directly proportional to the motor speed. Such arrangements are well-known and understood in this art. With the system of FIG. 9, the level of the signal appearing between output conductors 25e and 25b is related to the true horsepower output of the power plant. In lieu of the circuitry of FIG. 9, the battery or voltage supply unit 48 of FIG. 4 can be replaced by a tachometer driven in accordance with the output speed of the motor, thereby providing an indication of the true horsepower output of the power plant without incorporating voltage divider 90, linkage 92 and centrifugal unit 93 as illustrated in FIG. 9.

Figure 10:
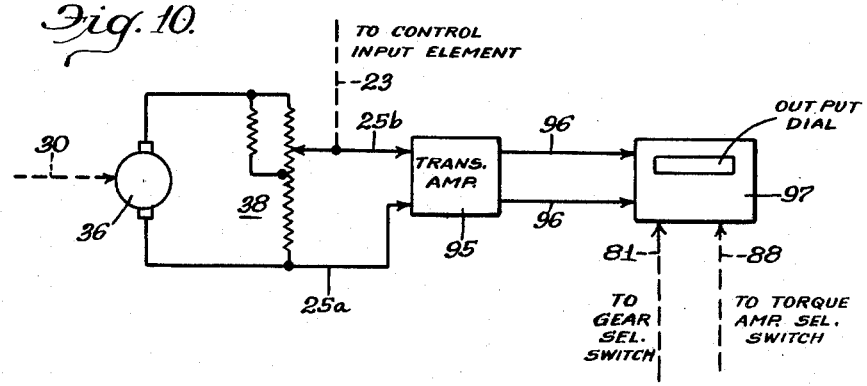
FIG. 10 is a simplified schematic diagram, partly in block form, of another embodiment of the invention.

The simple method of providing an indication of the horsepower, as illustrated in FIG. 3, provides an output signal which correctly indicates horsepower produced by the power plant at speeds near the reference speed for which the potentiometer 38 is provided, but such indication loses some accuracy at speeds greatly different than the reference speed. However, for practical purposes such a simple system can be utilized in conjunction with other components as indicated in FIG. 10, with the horsepower output indication appearing at conductors 25b and 25a applied to the input circuit of a transistorized amplifier 95, the output circuit of which is coupled over conductors 96 to an input circuit of output registration means 97, such as a digital counter wihch includes an output dial 98 for providing a visible indication of the actual horsepower. A conversion circuit, either electrical or mechanical, is provided within output means 97 for producing an output signal varying in accordance with a preassigned ratio as a function of the received input signal. Such conversion circuit may include adjustable means for altering the preassigned ratio of conversion. As before, linkages 81 and 88 provide an additional indication of the positions of the gear selector switch and torque amplifier selector switch, to actuate the adjustable means and thus provide the proper conversion ratio for each position of the gear selector and torque amplifier units. If desired, recording instruments can be coupled to the digital indicating unit 97 to provide a visible record of the actual operation of the vehicle utilizing the novel instrument system.

*Summary*

The present invention has moved the testing of a power plant to determine its actual power output from the area of a complicated and expensive laboratory procedure into the realm of a simple and economically practical instrument system which can readily be mounted on the power plant or vehicle utilizing the power plant. An embodiment constructed in accordance with the inventive principle and similar to that indicated in FIG. 10 of the drawings has been built and installed in the toolbox of a tractor, and satisfactorily operated to provide the actual power output indication as described above.

The motor input drive signal can readily be derived from the fuel pump rack in a diesel engine, the throttle plate in an L.P. gas power plant, the steam valve of a steam turbine arrangement, or the fuel supply control element in a free-piston construction. The individual elements of the novel instrument system are themselves simple and inexpensive, and they are readily mounted or coupled to available portions of the power plant to provide the requisite motor input signal, and where desired, speed output signal, for utilization in the inventive system.

Although only preferred embodiments of the invention have been described and illustrated, it is apparent that modifications and alterations may be made therein, and it is intended in the appended claims to cover all such alterations and modifications as may fall within the true spirit and scope of the invention.

What is claimed is:

1. An instrument system for providing an indication of the horsepower output of a motor having an input element displaceable to regulate the level of power input to the motor and an output element displaceable as a function of motor speed, comprising: an electrical transfer function circuit including a non-linear potentiometer having a pair of end terminals and a movable arm for simulating at least the torque and speed of the motor; means, including a linkage coupled between said motor input element and said movable arm of the potentiometer, for applying a motor input signal to said electrical circuit; means, including a tachometer coupled between said motor output element and said end terminals of the potentiometer, for applying a speed signal to said electrical circuit; and indicating means, coupled to said electrical circuit, for indicating the horsepower output of said motor as a function of said motor input signal, said speed signal, and the characteristics of said electrical transfer function circuit.

2. An instrument system for providing an indication of the torque output of a motor having an input element displaceable to regulate the level of power input to the motor, comprising: an electrical transfer function circuit for simulating at least one mechanical characteristic of the motor, said circuit including a first network representative of the basic torque characteristic of said motor and a second network representative of the torque rise correction factor of said motor; means including a first linkage, coupled between said motor input element and said first network, for applying a motor input signal to said first network; means including a second linkage, coupled between said motor input element and said second network, for applying a motor input signal to said second network; and indicating means, coupled to said electrical circuit, for indicating the torque output of said motor as a function of said motor input signal and of the characteristics of each of said networks in the electrical circuit.

3. An instrument system as set forth in claim 2 and further comprising a signal divider means coupled between said electrical transfer function circuit and said indicating means, said signal divider means having a movable connection; control means coupled to said motor for providing movement as a function of motor speed; and linkage means coupled between said control means and said movable connection of the signal divider means for displacing said movable connection as a function of motor speed, whereby said indicating means is provided with an electrical signal indicative of the horsepower output of said motor.

4. An instrument system for providing an indication of the torque output of a motor having an input element displaceable to regulate the level of power input to the motor, comprising: an electrical transfer function circuit for simulating at least one mechanical characteristic of the motor, said circuit including a first network representative of the basic torque characteristic of said motor comprising a first potentiometer having a pair of end terminals and a movable connection, and means for applying a potential difference across said end terminals, and a second network representative of the torque rise correction factor of said motor comprising a second potentiometer having a pair of end terminals and a movable connection, energy conversion means having a pair of output terminals and connected to produce an electrical signal related to the speed of said motor, means for coupling one of said output terminals of the energy conversion means to one of said end terminals of the second potentiometer, means for establishing a reference electrical potential difference coupled between the other of said output terminals of the energy conversion means and the other of said end terminals of the second potentiometer, means including the movable connection of said first potentiometer for intercoupling said first and second networks; means, coupled between said motor input element and the movable connection of each of said potentiometers, for applying a motor input signal to each of said networks; and indicating means, coupled to said electrical circuit, for indicating the torque output of said motor as a function of said motor input signal and of the characteristics of each of said networks in the electrical circuit.

5. An instrument system according to claim 6 in which said means for applying a potential difference in said first network includes tachometer means for providing an electrical signal of a level related to motor speed, thereby producing a horsepower output indication on said indicating means.

6. An instrument system for providing an indication of the torque output of a motor having a carburetor including a throttle plate journaled on a throttle shaft displaceable to regulate the level of the power input to the motor, comprising: an electrical transfer function circuit for simulating at least one mechanical characteristic of the motor, said circuit including a first network representative of the basic torque characteristic of said motor and having a first movable element, and a second network representative of the torque rise correction factor of said motor and having a second movable element; means including a linkage coupled between said throttle shaft and each of said movable elements for applying a motor input signal to said first and said second networks; and indicating means, coupled to said electrical circuit, for indicating the torque output of said motor as a function of said motor input signal and of the characteristics of each of said networks in the electrical circuit.

7. An instrument system for providing an indication of the drawbar output at the drawbar of a vehicle having a motor and a power modification means coupled to said motor, said motor having an input element displaceable to regulate the level of power input thereto, and said power modification means including a gear selector switch and a torque amplifier selector switch, comprising: a first electrical circuit for simulating the torque of the motor; means, coupled between said motor input element and said first electrical circuit, for applying a motor input signal to said first electrical circuit; a second electrical circuit, having a first input means coupled to said first electrial circuit and a second input means coupled to said power modification means, for providing an output signal related to the output power of said motor as regulated by said power modification means; and indicating means, coupled to said second electrical circuit, for indicating the drawbar output in accordance with the output signal provided by said second electrical circuit, said second electrical circuit comprising; a first electrical signal divider means including a plurality of selective connections; a first switching means, coupled to said gear selector switch and operable thereby to engage one of said selective connections to provide an intermediate electrical signal related both to torque output of the motor and to the position of said gear selector switch; a second electrical signal divider means including a second plurality of selective connections; means, including said first switching means, for applying said intermediate electrical signal to said second electrical signal divider; and a second switching means, coupled to said torque amplifier selector switch and operable thereby to engage one of said second plurality of selective connections to provide an output electrical signal related to the torque output of the motor, the position of said gear selector switch, and the position of said torque amplifier selector switch.

References Cited by the Examiner
UNITED STATES PATENTS

| | | | |
|---|---|---|---|
| 1,377,963 | 5/21 | Horvath | 73—112 X |
| 1,595,960 | 8/26 | Brown | 73—112 X |
| 2,268,072 | 12/41 | Hansmann | 73—116 X |
| 2,888,067 | 5/59 | Kuzmitz | 73—116 X |
| 2,995,929 | 8/61 | Lindquist | 73—116 |
| 3,019,604 | 2/62 | Hall | 73—116 X |
| 3,019,640 | 2/62 | Engelmann | 73—116 X |

FOREIGN PATENTS

| | | |
|---|---|---|
| 577,973 | 6/59 | Canada. |

RICHARD C. QUEISSER, *Primary Examiner.*

ROBERT EVANS, *Examiner.*